US009467274B2

(12) United States Patent
Kotecha et al.

(10) Patent No.: US 9,467,274 B2
(45) Date of Patent: Oct. 11, 2016

(54) PROCESSING COMMUNICATIONS VIA A SENSOR NETWORK

(71) Applicant: Verizon Patent and Licensing Inc., Basking Ridge, NJ (US)

(72) Inventors: Lalit R. Kotecha, San Ramon, CA (US); Chris S. Neisinger, Danville, CA (US); Sagiv Draznin, Walut Creek, CA (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 611 days.

(21) Appl. No.: 13/950,739

(22) Filed: Jul. 25, 2013

(65) Prior Publication Data
US 2015/0031381 A1    Jan. 29, 2015

(51) Int. Cl.
G06F 19/00 (2011.01)
H04L 5/00 (2006.01)
H04W 4/00 (2009.01)
H04W 4/20 (2009.01)

(52) U.S. Cl.
CPC ............ *H04L 5/0092* (2013.01); *H04W 4/005* (2013.01); *H04W 4/006* (2013.01); *H04W 4/20* (2013.01)

(58) Field of Classification Search
USPC ............................ 370/230; 700/2; 455/452.1
See application file for complete search history.

(56) References Cited

U.S. PATENT DOCUMENTS

| 5,774,668 | A  | * | 6/1998  | Choquier | G06F 9/505 370/480 |
| 7,136,709 | B2 | * | 11/2006 | Arling   | G05B 15/02 340/3.1 |
| 2002/0077077 | A1 | * | 6/2002  | Rezvani   | H04L 63/08 455/410 |
| 2005/0273508 | A1 | * | 12/2005 | Humpleman | H04L 12/2803 709/223 |
| 2006/0080408 | A1 | * | 4/2006  | Istvan    | G06F 17/30861 709/219 |
| 2006/0161645 | A1 | * | 7/2006  | Moriwaki  | G06Q 10/06 709/223 |
| 2006/0282498 | A1 | * | 12/2006 | Muro      | H04L 67/34 709/203 |
| 2008/0076450 | A1 | * | 3/2008  | Nanda     | G01D 21/00 455/456.1 |
| 2010/0080206 | A1 | * | 4/2010  | Yamada    | H04W 48/14 370/338 |
| 2011/0035059 | A1 | * | 2/2011  | Ersavas   | A01G 1/00 700/276 |
| 2012/0203386 | A1 | * | 8/2012  | Fakos     | G05B 15/02 700/291 |
| 2013/0227569 | A1 | * | 8/2013  | Kohli     | G06F 9/455 718/1 |
| 2014/0359552 | A1 | * | 12/2014 | Misra     | H04L 67/12 717/100 |

* cited by examiner

*Primary Examiner* — Kidest Bahta

(57) ABSTRACT

A first device may receive provisioning information for a second device; establish a tunnel with the second device within a first network based on receiving the provisioning information; provide the provisioning information to the second device to cause the second device to gather or process data within the first network; and receive a command instruction from a user device via a second network. The command instruction may relate to the data gathered or processed by the second device. The first network may be separate from the second network. The first device may communicate with the second device within the first network and independently of the second network to process the command instruction; form a response to the command instruction based on processing the command instruction; and provide the response to the command instruction towards the user device.

20 Claims, 11 Drawing Sheets

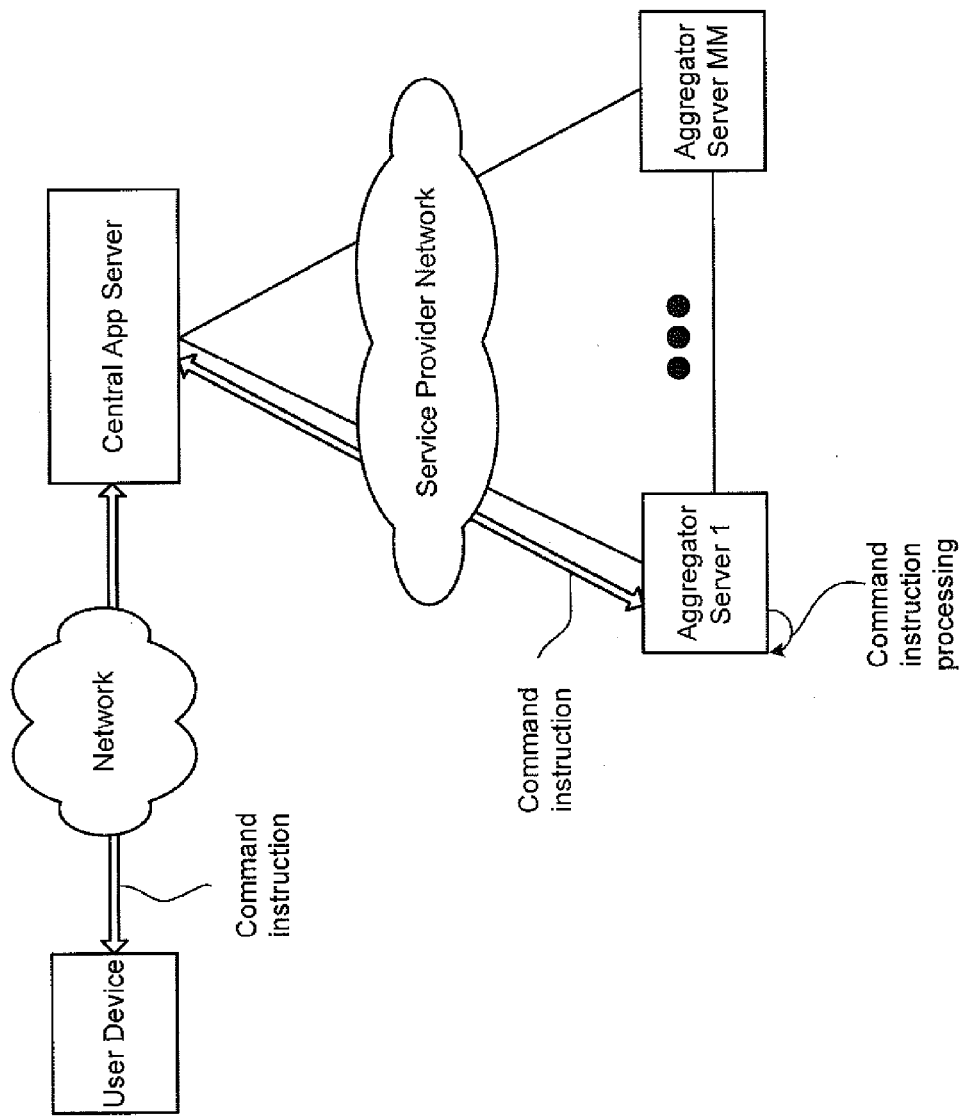

| App Device ID | Address | Application | Authorized Users |
|---|---|---|---|
| AD-123 | Address 1.1 | APP123 | User List 1 |
| AD-456 | Address 2.1 | APP456 | User List 2 |
| AD-789 | Address 3.1 | APP789 | User List 3 |

Aggregator Server Topology Field 530

Fig. 5B

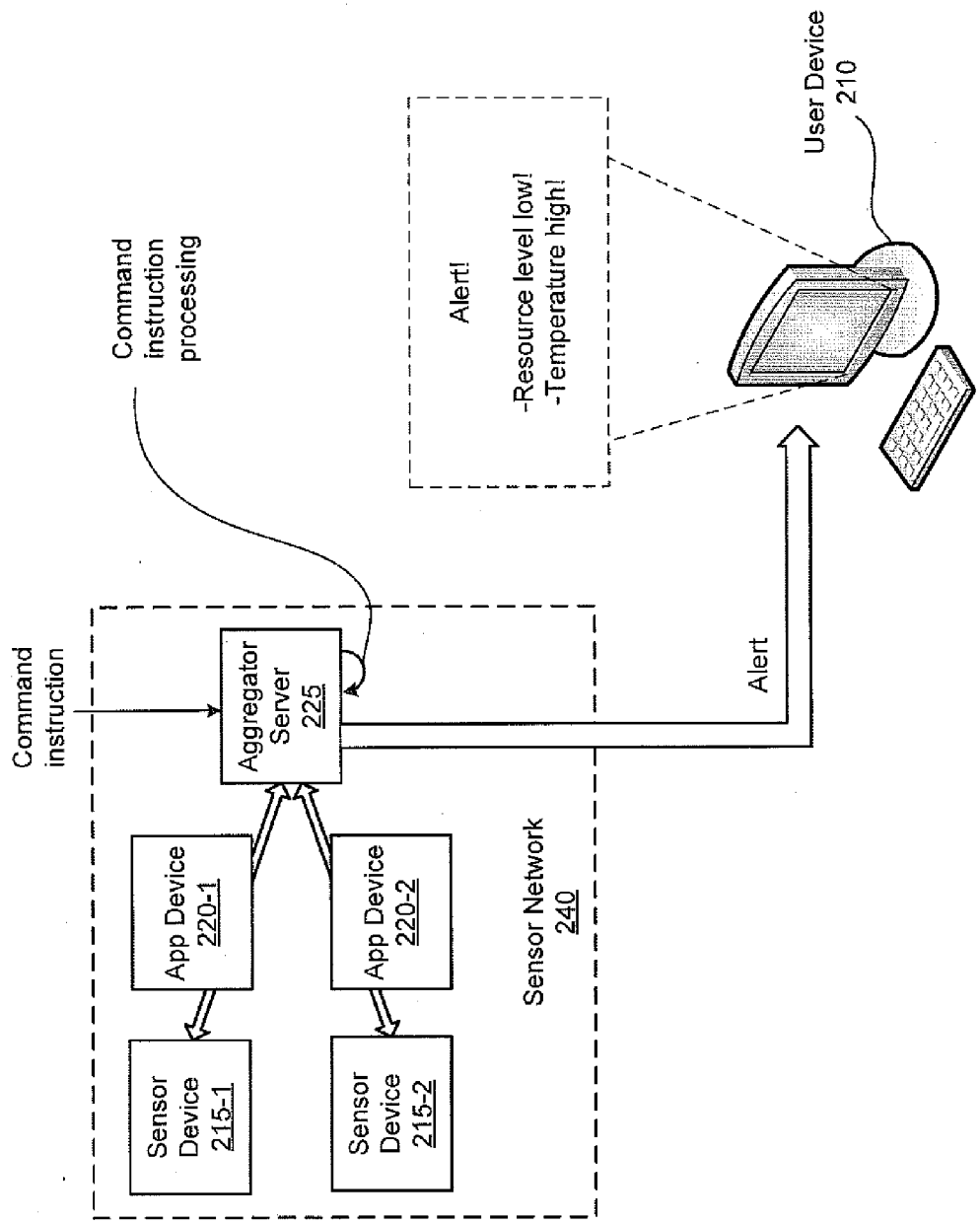

PROCESSING COMMUNICATIONS VIA A SENSOR NETWORK

BACKGROUND

Sensor devices are sometimes used to gather data and provide the data via a service provider network (e.g., a cellular network). Users sometimes communicate with the sensor devices (e.g., using user devices) via the service provider network to receive data gathered by the sensor devices (e.g., to process the data, to use the data to aid in analysis, or for some other purpose). Processing communications between the user devices and the sensor devices imposes network load on the service provider network, thereby increasing costs and increasing the risk for outages and/or failures.

BRIEF DESCRIPTION OF THE DRAWINGS

FIGS. 1A-1B illustrate an example overview of an implementation described herein;

FIGS. 5A-5B illustrate an example data structure that may be stored by one or more devices in the environment of FIG. 2;

FIGS. 7-9 illustrate example implementations as described herein.

DETAILED DESCRIPTION OF THE PREFERRED EMBODIMENTS

The following detailed description refers to the accompanying drawings. The same reference numbers in different drawings may identify the same or similar elements.

Systems and/or methods, as described herein, may reduce network load on a service provider network (e.g., a cellular network) by processing a command instruction via a local sensor network (referred to herein after as a "sensor network"). That is, the command instruction may be processed independently of the service provider network, thereby reducing network load on the service provider network. In some implementations, the command instruction may correspond to a request for data gathered by one or more sensor devices in the sensor network, an instruction to direct the one or more sensor devices to perform a task (e.g., adjust a configuration or orientation of a sensor, cause the sensor to gather and/or transmit data at particular times, capture an image, capture audio, and/or perform some other task) or some other type of instruction relating to data gathered by the one or more sensor devices.

Figure 1A:
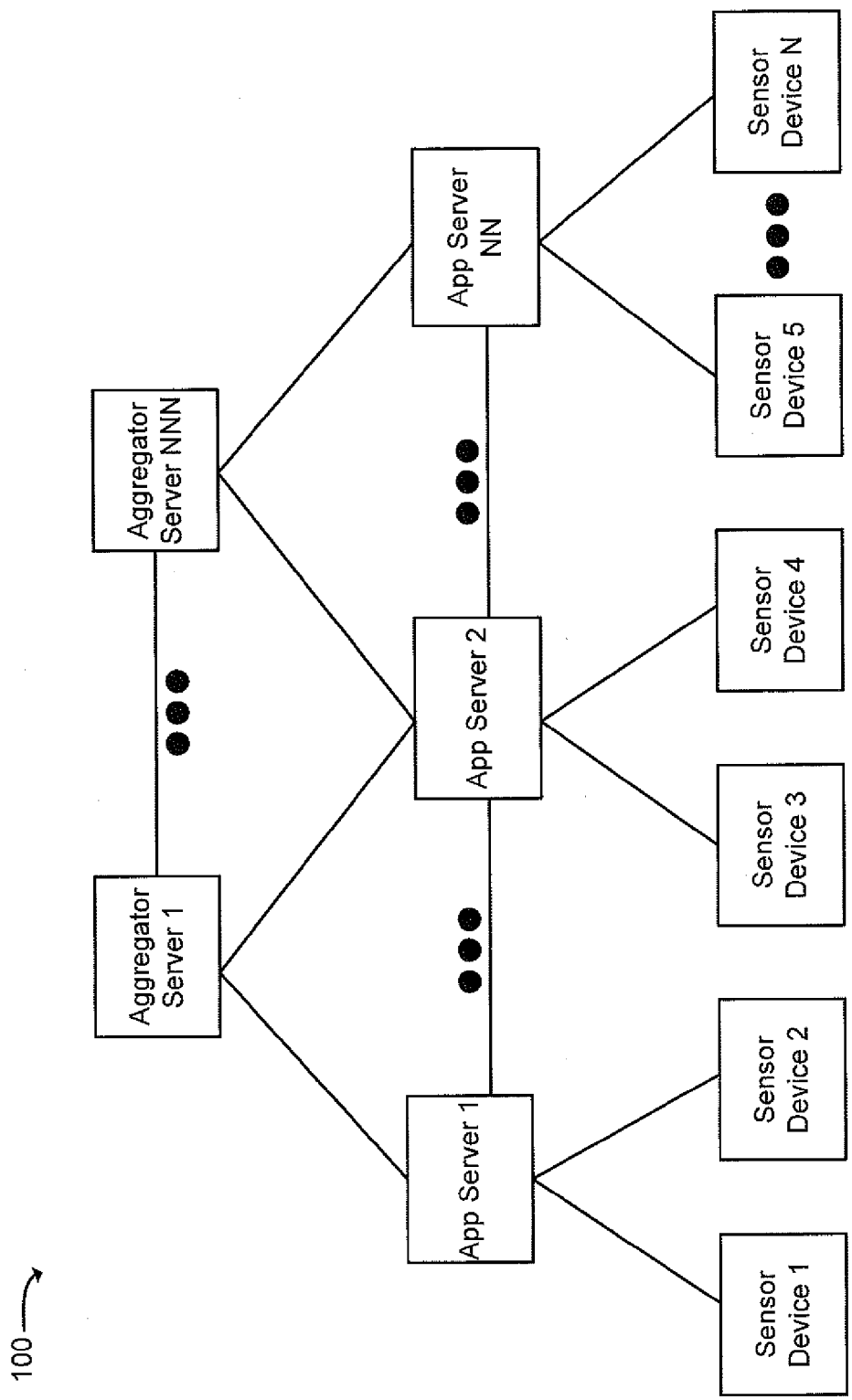

FIGS. 1A-1B illustrate an example implementation as described herein. As shown in FIG. 1A, a sensor network 100 may include a hierarchal architecture connecting multiple sensor devices (e.g., sensor devices 1 through N, where N>1), multiple application devices (hereinafter referred to as "app devices") (e.g., app devices 1 through NN, where NN>1), and one or more aggregator servers (e.g., aggregator servers 1 through NNN, where N≥1). In some implementations, each of the multiple sensor devices may gather data (e.g., raw data), such as temperature measurements, resource level measurements, object detection data, motion detection data, switch triggering data, fire/smoke/carbon monoxide detection data, video related data, audio related data, or the like. In some implementations, particular sensor devices may connect with particular app devices.

In some implementations, each app device may be associated with a particular application to process data gathered by particular sensor devices. As an example, app device 1 may process temperature measurements, gathered by sensor device 1 and/or sensor device 2, to identify an average temperature over a particular amount of time and to identify when a temperature measurement exceeds a predetermined threshold. In some implementations, an app device may send a control instruction to a sensor device. As an example, the app device may send a control instruction to cause the sensor device to capture an image via a camera associated with the sensor device. As described in greater detail below, other examples of processing data and providing instructions to sensor devices are possible.

In some implementations, an aggregator server may be associated with multiple app devices to process a command instruction involving multiple sensor devices and multiple app devices.

Referring to FIG. 1B, a user device may provide a command instruction to a central app device. The central app device may provide the command instruction via a service provider network to a particular aggregator server (e.g., aggregator server 1). Alternatively, the user device may provide the command instruction directly to aggregator server 1. In some implementations, aggregator server 1 may process the command instruction independently of the service provider network. For example, the command instruction may be processed via the sensor network, thereby reducing network load on the service provider network.

As an example, the command instruction may include an instruction to capture an image (e.g., using sensor device 1 associated with app device 1) when an object is detected (e.g., when the object is detected by sensor device 2 associated with app device 2). In some implementations, aggregator server 1 may communicate with app device 2 to receive an indication that the object has been detected by sensor device 2 and may communicate with app device 1 to direct sensor device 1 to capture an image. As described below, other examples of processing a command instruction are possible from the example described with respect to FIGS. 1A-1B.

In some implementations, communications between sensor device 1, app device 1, sensor device 2, app device 2, and aggregator server 1 (e.g., to process the command instruction) may occur within the sensor network, thereby reducing network load of the service provider network while allowing the user device to provide the command instruction via the service provider network. Also, processing communications within the sensor network may prevent the need for the sensor devices and/or the app devices to communicate via the service provider network, thereby reducing labor and/or other costs associated with establishing/maintaining connections between the sensor devices, the app devices, and the service provider network. For example, the connections to the service provider network may be associated with bearers having higher quality of service (QoS) requirements than needed to process communications between the sensor devices, the app devices, and/or the aggregator devices.

In some implementations, app devices may receive provisioning information for multiple sensor devices such that when a sensor device connects to the sensor network, the sensor device may be provisioned by an associated app device (e.g., receive and execute instructions that identify how data is to be gathered by the sensor device), thereby allowing multiple sensor devices to be concurrently provisioned. Further, aggregator servers may receive provisioning information for multiple app devices such that when an app device connects to the sensor network, the app device may be provisioned (e.g., receive and execute instructions that identify how data is to be processed by the app device), thereby allowing multiple app devices to be concurrently provisioned.

Figure 2:
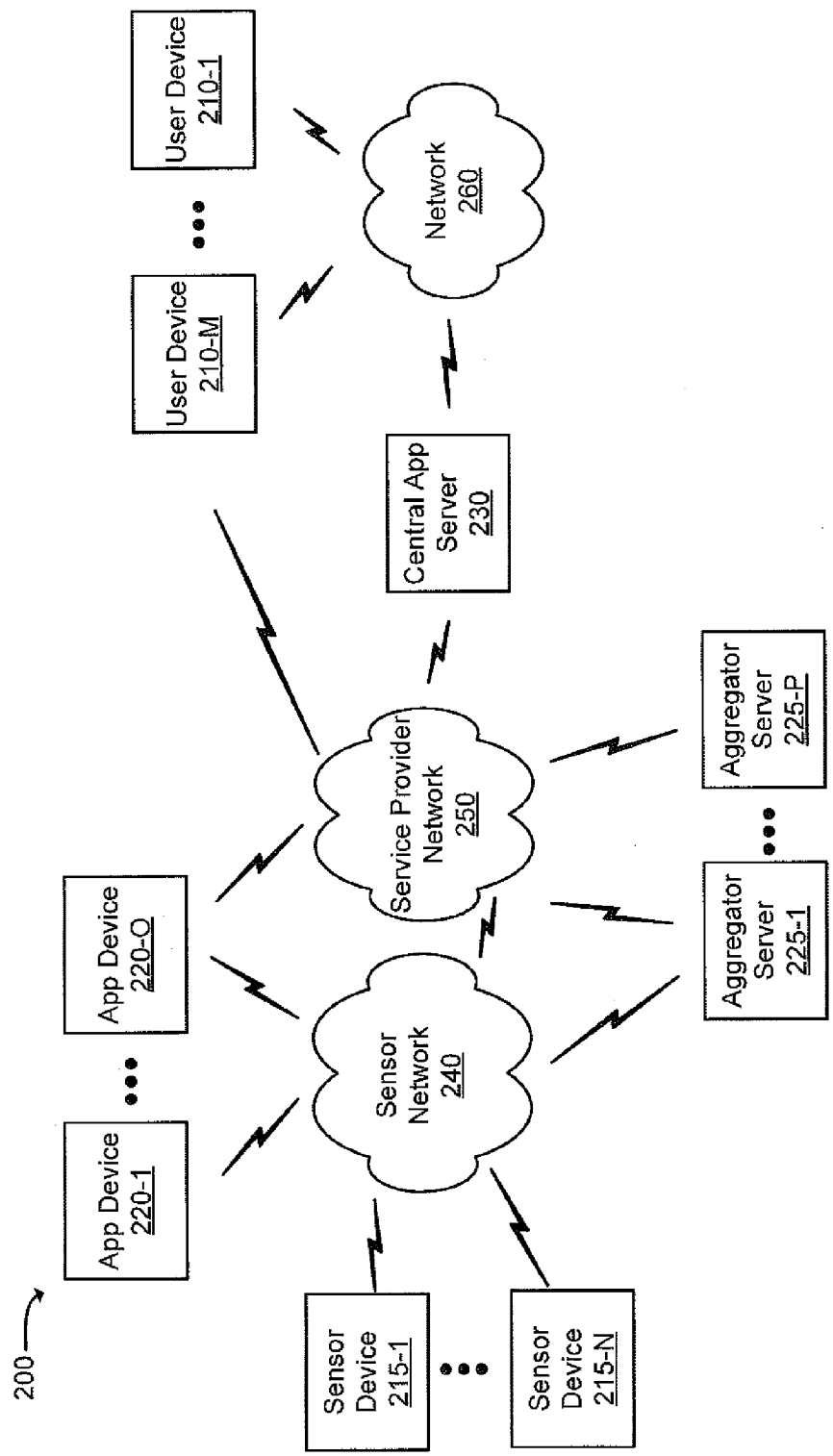
FIG. 2 illustrates an example environment in which systems and/or methods, described herein, may be implemented.

FIG. 2 is a diagram of an example environment 200 in which systems and/or methods described herein may be implemented. As shown in FIG. 2, environment 200 may include user devices 210-1, . . . , 210-M (where M≥1), sensor devices 215-1 . . . , 215-N (where N≥1), application (app) devices 220-1, . . . , 220-O (where O≥1), aggregator servers 225-1, . . . 225-P (where P≥1), central app device 230, sensor network 240, service provider network 250, and network 260.

User device 210 may include a device capable of communicating via a network, such as service provider network 250 and/or network 260. For example, user device 210 may correspond to a mobile communication device (e.g., a smart phone or a personal digital assistant (PDA)), a portable computer device (e.g., a laptop or a tablet computer), a desktop computing device, a server device, or some other computing device.

In some implementations, user device 210 may provide a command instruction. In some implementations, the command instruction may include a request for data gathered by one or more sensor devices 215 and/or processed by one or more app devices 220. Additionally, or alternatively, the command instruction may include a control instruction for sensor device 215. For example, the control instruction may include an instruction to direct the one or more sensor devices 215 to perform a task (e.g., adjust a configuration or orientation of sensor device 215, cause sensor device 215 to gather and/or transmit data at particular times, capture an image, capture audio, trigger a switch/actuator, and/or perform some other task).

In some implementations, the control instruction may include a one-time instruction to perform a task, or a recurring instruction to perform a task (e.g., at particular times, based on the occurrence of an event as identified by sensor device 215 and/or app device 220, etc.). Additionally, or alternatively, the command instruction may include some other type of instruction relating to data gathered by one or more sensor devices 215. In some implementations, user device 210 may provide the command instruction via an application programming interface (API), a web portal, or the like.

In some implementations, user device 210 may correspond to a web server device that may receive data gathered by sensor device 215 and/or processed by app device 220 and/or aggregator server 225 and may store the data for publishing to a web site or the like.

In some implementations, user device 210 may correspond to an operator user device 210 to provide provisioning information to aggregator server 225 to direct aggregator server 225 to provision sensor device 215 and/or app device 220 (e.g., to register sensor device 215 and/or app device 220 with a particular entity, such as a user, an organization, a company, a facility, etc.). In some implementations, user device 210 may provide provisioning information for multiple sensor devices 215 and/or app devices 220 to direct aggregator server 225 to concurrently provision multiple sensor devices 215 and/or app devices 220.

Sensor device 215 may include one or more sensors capable of communicating via a network. For example, sensor device 215 may include a network device (e.g., a modem, a switch, a gateway, etc.), a sensing device, a processing device, a metering device, a switch, an actuator, a camera, a timer, a signal detection device (e.g., to detect the presence of a signal, such as Bluetooth signal, an infrared signal, etc.), and/or some other type of device. In some implementations, sensor device 215 may gather data and form a data record associated with the data. For example, a data record may include a temperature measurement, a resource usage measurement, a motion detection indication, an object detection indication, a facility intrusion detection indication, or some other measurement and/or indication.

In some implementations, each data record may include a timestamp, information identifying a particular sensing/metering device of sensor device 215 used to gather the data in the data record, information regarding a particular product associated with the data, information regarding a particular facility associated with the data, information regarding a particular geographic location associated with the data, and/or some other information regarding the data. Additionally, or alternatively, the data record may include a computer file, such as a video file, an image file, an audio file, a text file, or the like.

In some implementations, data records may be used to aid in an analysis. For example, the data records may be used to aid in a sales trend analysis, a resource usage analysis, a product interest level trend analysis (e.g., to provide targeted advertising based on product interest), and/or some other type of analysis. Additionally, or alternatively, the data records may be used for some other purpose. For example, the data records may be used to alert a user of the occurrence of an event (e.g., a facility intrusion event, an event that identifies when resources have dropped below a particular threshold, and/or some other type of event).

In some implementations, sensor device 215 may further include a network device to provide a data flow (including the processed data) towards app device 220 via sensor network 240.

In some implementations, sensor device 215 may receive a control instruction from app device 220 (e.g., as part of a command instruction provided by user device 210). In some implementations, the control instruction may cause sensor device 215 to trigger a switch, an actuator, an image capturing device, or some other type of device associated with sensor device 215.

In some implementations, sensor device 215 may be a machine-to-machine (M2M) device. In some implementations, sensor device 215 may include another type of device that gathers, stores, processes, and/or transmits data.

App device 220 may include a computing device, such as a server device, a desktop computing device, a portable computing device (e.g., a laptop, a tablet, a mobile phone, etc.), an M2M device, and/or some other type of computing device. In some implementations, app device 220 may include one or more applications that receive data gathered by a sensor of sensor device 215 (e.g., via sensor network 240) and may form processed data associated with the data. For example, the processed data may correspond to a data analysis associated with the data, such as a temperature trend analysis, an inventory analysis, a sales trend analysis, etc. In some implementations, app device 220 may provide a control instruction to sensor device 215. In some implementations, app device 220 may be accessed via service provider network 240 (e.g., to provide security in accessing app device 220). In some implementations, sensor device 215 and app device 220 may be integrated together as part of an M2M device.

Aggregator server 225 may include a server device or a collection of server devices. In some implementations, aggregator server 225 may process a command instruction received from user device 210. In some implementations, aggregator server 225 may communicate with multiple sensor devices 215 and/or multiple app devices 220 in order to process a command instruction and/or to provision multiple sensor devices 215 and/or multiple app devices 220. For example (e.g., when the command instruction includes a request for data gathered by multiple sensor devices 215), central app device 225 may identify particular app devices 220 and/or particular sensor devices 215 associated with the data, receive the data from the particular app devices 220 and/or particular sensor devices 215, and provide the data to user device 210 as a response to the command instruction (e.g., via central app device 230). In some implementations (e.g., when the command instruction includes control instructions for multiple sensor devices 215 to perform a task based on processed data formed by app devices 220), aggregator server 225 may provide the control instructions to the multiple app devices 220 to cause the multiple sensor devices 215 to perform the task.

In some implementations, aggregator server 225 may receive provisioning information for app devices 220 and/or sensor devices 215 to provision app devices 220 and/or cause sensor devices 215 to be provisioned by app devices 220. In some implementations, communications between sensor devices 215, app device 220, and/or aggregator server 225 (e.g., to process the command instruction and/or to provision app devices 220 and/or sensor devices 215) may occur within sensor network 240, thereby reducing network load on service provider network 250.

In some implementations, aggregator server 225 may store data gathered and/or processed by sensor device 215 and/or app device 220 and may provide the data (e.g., via service provider network 250) to user device 210 as part of a response to a command instruction. In some implementations, aggregator server 225 may provide the data at off-peak times (to reduce load on service provider network 250 at peak times). In some implementations, aggregator server 225 may connect to service provider network 250 via bearers that provide particular network resources that are sufficient to provide the data and/or responses to command instructions without providing excess network resources that may not be needed to provide the data and/or responses to the command instructions.

Central app device 230 may include a server device or a collection of server devices. In some implementations, central app device 230 may receive a command instruction, from user device 210, to communicate with sensor device 215. In some implementations, central app device 230 may authenticate user device 210 based on receiving the command instruction and may provide the command instruction, on behalf of user device 210, to aggregator server 225 (e.g., to prevent direct access of aggregator server 225 by user device 210). In some implementations, central app device 230 may select a particular aggregator server 225 to which to provide the command instruction based on app devices 220 and/or sensor devices 215 associated with the command instruction and connected to the particular aggregator server 225.

Sensor network 240 may include one or more wired and/or wireless networks. For example, sensor network 240 may include a Bluetooth network, a near-field communications (NFC) network, a ZigBee network, an infrared network, a radio frequency (RF) network, a public land mobile network (PLMN), and/or a cellular network (e.g., a second generation (2G) network, a third generation (3G) network, a fourth generation (4G) network, a fifth generation (5G) network, a long term evolution (LTE) network, etc.). Additionally, or alternatively, sensor network 240 may include a local area network (LAN), a wireless LAN (WLAN), a wide area network (WAN), a metropolitan network (MAN), a telephone network (e.g., the Public Switched Telephone Network (PSTN)), an ad hoc network, a managed IP network, a virtual private network (VPN), an intranet, the Internet, a fiber optic-based network, or a combination of these or other types of networks.

Service provider network 250 may include one or more wired and/or wireless networks. For example, service provider network 250 may include a PLMN, and/or a cellular network. Additionally, or alternatively, service provider network 250 may include a LAN, a WLAN, a WAN a MAN, a telephone network (e.g., the PSTN), an ad hoc network, a managed IP network, a virtual private network (VPN), an intranet, the Internet, a fiber optic-based network, or a combination of these or other types of networks.

In some implementations, service provider network 250 may include an evolved packet core (EPC) having a serving gateway (SGW), a packet data network (PDN) gateway (PGW), a mobile management entity (MME) device, and/or some other device to transmit data to/from user device 210, sensor device 215, app device 220, aggregator server 225, and/or central app device 230. In some implementations, service provider network 250 may include a private EPC that prevents direct access of sensor device 215, app device 220, and/or aggregator server 225 (e.g., by user device 210). For example, the private EPC may communicate with an authorized device (e.g., central app device 230) such that central app device 230 may provide a command instruction to aggregator server 225 for processing.

Network 260 may include one or more wired and/or wireless networks. For example, network 250 may include a cellular network, and/or a PLMN. Additionally, or alternatively, network 260 may include a LAN, a WLAN, a WAN, a MAN, a telephone network (e.g., the PSTN), an ad hoc network, a managed IP network, a virtual private network (VPN), an intranet, the Internet, a fiber optic-based network, and/or a combination of these or other types of networks.

The quantity of devices and/or networks, illustrated in FIG. 2, is not limited to what is shown. In practice, there may be additional devices and/or networks; fewer devices and/or networks; different devices and/or networks; or differently arranged devices and/or networks than illustrated in FIG. 2. Also, in some implementations, one or more of the devices of environment 200 may perform one or more functions described as being performed by another one or more of the devices of environment 200. Devices of environment 200 may interconnect via wired connections, wireless connections, or a combination of wired and wireless connections.

Figure 3:
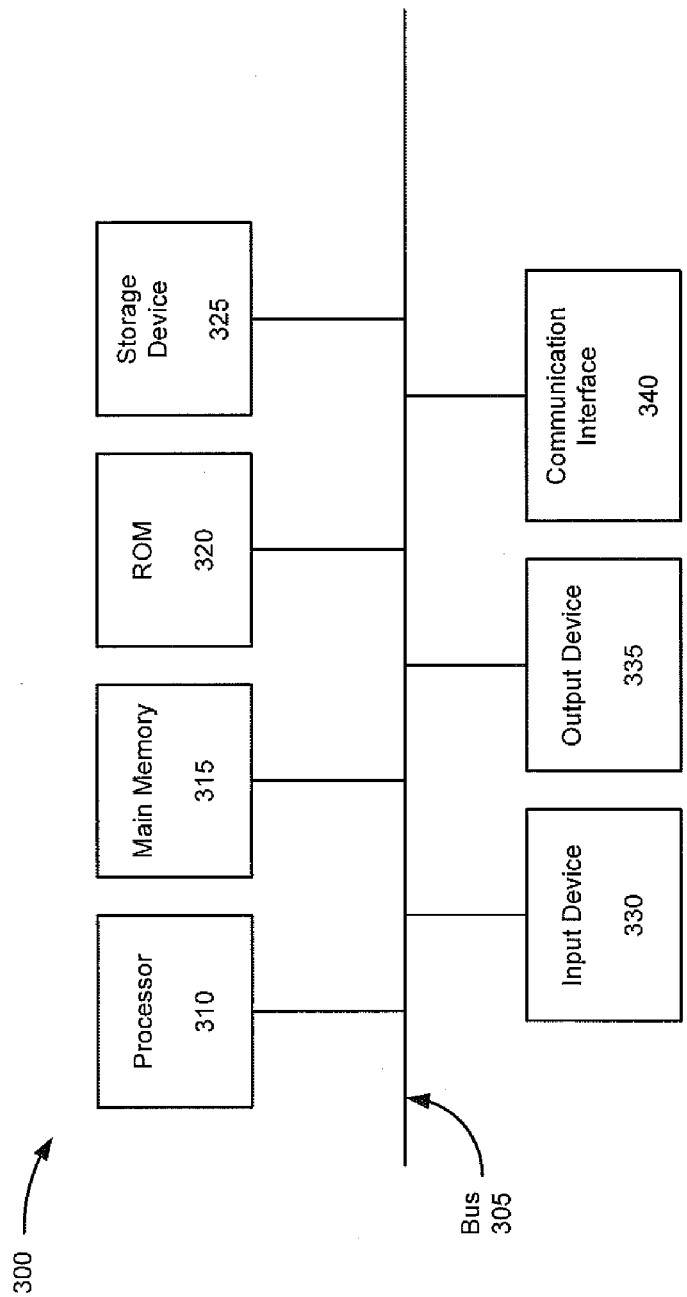
FIG. 3 illustrates example components of a device that may be used within the environment of FIG. 2.

FIG. 3 illustrates example components of a device 300 that may be used within environment 200 of FIG. 2. Device 300 may correspond to user device 210, sensor device 215, app device 220, aggregator server 225, and/or central app device 230. Each of user device 210, sensor device 215, app device 220, aggregator server 225, and/or central app device 230 may include one or more devices 300 and/or one or more components of device 300.

As shown in FIG. 3, device 300 may include a bus 305, a processor 310, a main memory 315, a read only memory (ROM) 320, a storage device 325, an input device 330, an output device 335, and a communication interface 340.

Bus 305 may include a path that permits communication among the components of device 300. Processor 310 may include a processor, a microprocessor, an application specific integrated circuit (ASIC), a field programmable gate array (FPGA), or another type of processor that interprets and executes instructions. Main memory 315 may include a random access memory (RAM) or another type of dynamic storage device that stores information or instructions for execution by processor 310. ROM 320 may include a ROM device or another type of static storage device that stores static information or instructions for use by processor 310. Storage device 325 may include a magnetic storage medium, such as a hard disk drive, or a removable memory, such as a flash memory.

Input device 330 may include a component that permits an operator to input information to device 300, such as a control button, a keyboard, a keypad, or another type of input device. Output device 335 may include a component that outputs information to the operator, such as a light emitting diode (LED), a display, or another type of output device. Communication interface 340 may include any transceiver-like component that enables device 300 to communicate with other devices or networks. In some implementations, communication interface 340 may include a wireless interface, a wired interface, or a combination of a wireless interface and a wired interface.

Device 300 may perform certain operations, as described in detail below. Device 300 may perform these operations in response to processor 310 executing software instructions contained in a computer-readable medium, such as main memory 315. A computer-readable medium may be defined as a non-transitory memory device. A memory device may include memory space within a single physical storage device or memory space spread across multiple physical storage devices.

The software instructions may be read into main memory 315 from another computer-readable medium, such as storage device 325, or from another device via communication interface 340. The software instructions contained in main memory 315 may direct processor 310 to perform processes that will be described later. Alternatively, hardwired circuitry may be used in place of or in combination with software instructions to implement processes described herein. Thus, implementations described herein are not limited to any specific combination of hardware circuitry and software.

In some implementations, device 300 may include additional components, fewer components, different components, or differently arranged components than are shown in FIG. 3.

Figure 4:
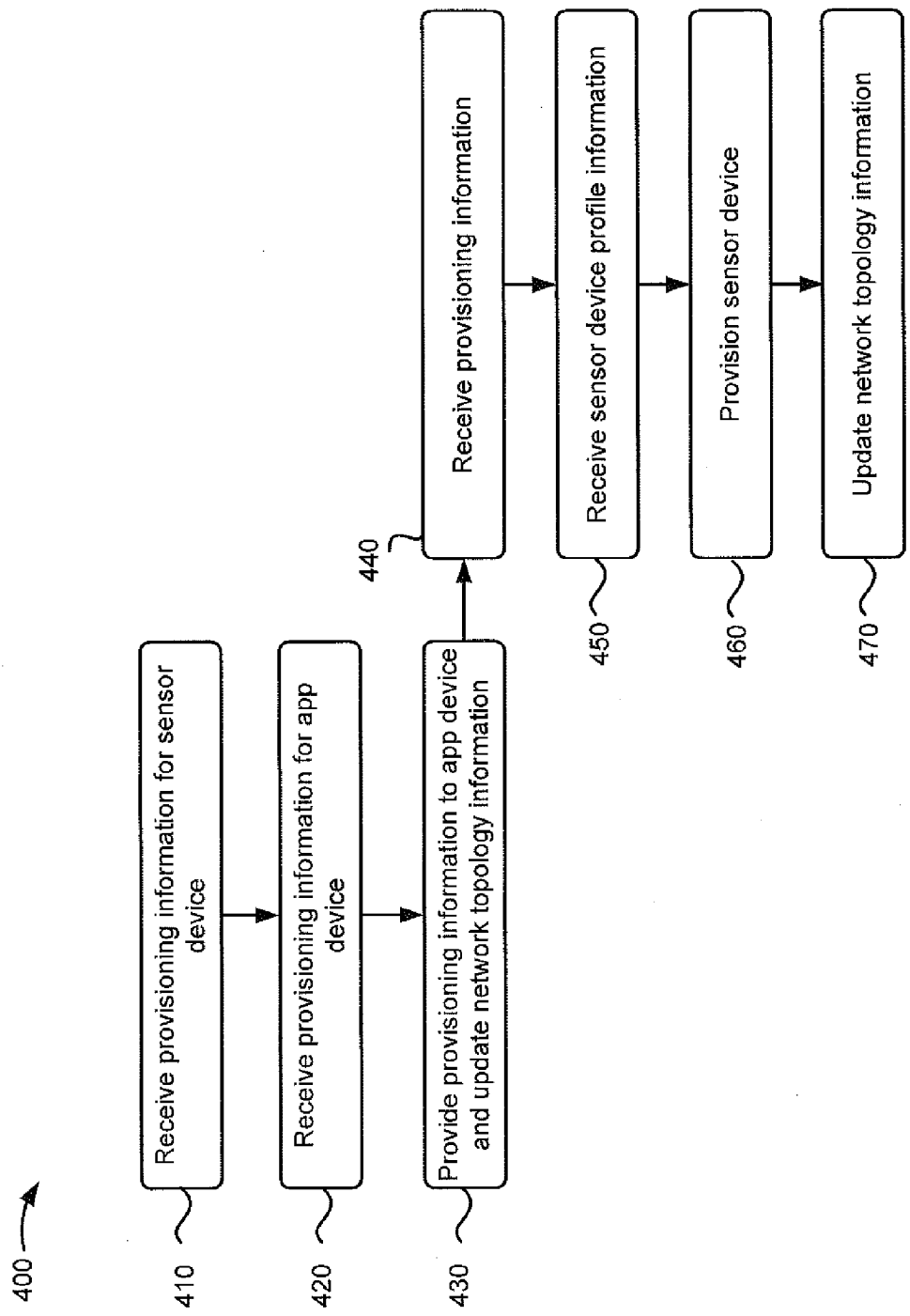
FIG. 4 illustrates a flowchart of an example process for provisioning app devices and sensor devices.

FIG. 4 illustrates a flowchart of an example process 400 for provisioning app devices and sensor devices. In some implementations, process 400 may be performed by one or more components of aggregator server 225 and/or app device 220. In some implementations, some or all of blocks of process 400 may be performed by one or more components of another device in environment 200 (e.g., user device 210 sensor device 215, and/or central app device 230), or a group of devices including or excluding aggregator server 225 and/or app device 220.

As shown in FIG. 4, process 400 may include receiving provisioning information for a sensor device (block 410). For example, aggregator server 225 may receive the provisioning information for sensor device 215 from an operator user device 210 (e.g., via a user interface, a web portal, an application, or the like). In some implementations, the provisioning information may correspond to a sensor device 215 that is to be added to sensor network 240. Alternatively, the provisioning information may correspond to an update to provisioning information for an existing sensor device 215 in sensor network 240. In some implementations, aggregator server 225 may receive the provisioning information for a multiple sensor devices 215.

In some implementations, the provisioning information for sensor device 215 may include information to prepare sensor device 215 to gather data, form data records based on the gathered data, and provide the data and/or the data records to app device 220 for processing. For example, the provisioning information may identify a type of data gathered by sensor device 215 (e.g., temperature date, metering data, object detection data, etc.), a processing application that may be used by app device 220 to process the data, data gathering instructions that identify when and/or how sensor device 215 is to gather data, and/or a data record format for data records that are to be formed by sensor device 215.

In some implementations, the provisioning information may be based on a data class associated with data gathered by sensor device 215. For example, provisioning information for a sensor device 215 that gathers class 1 data may differ than provisioning information for a sensor device 215 that gathers class 2 data. As an example, class 1 data may correspond to temperature measurements, whereas class 2 data may correspond to resource metering measurements. Additional examples of different data classes and different provisioning information for sensor devices 215 associated with different data classes are described below with respect to FIG. 5A.

Process 400 may also include receiving provisioning information for an app device (block 420). For example, aggregator server 225 may receive the provisioning information for app device 220 from an operator user device 210 (e.g., via a user interface, a web portal, an application, or the like). In some implementations, the provisioning information may correspond to an app device 220 that is to be added to sensor network 240 in order to process data gathered by sensor device 215 and is to be connected to aggregator server 225. Alternatively, the provisioning information may correspond to an update to provisioning information for an existing app device 220 in sensor network 240 and connected to aggregator server 225. In some implementations, aggregator server 225 may receive the provisioning information for multiple app devices 220.

In some implementations, the provisioning information may include information to prepare app device 220 to process data gathered by one or more sensor devices 215. For example, the provisioning information may include an identifier of app device 220, information identifying particular sensor devices 215 whose data is to be processed by app device 220, and/or information identifying classes of data that app device 220 may process.

Additionally, or alternatively, the provisioning information may identify an application that app device 220 may use to process data, processing instructions that identify how the data is to be processed in order to form processed data records, information identifying users that are authorized to communicate with app device 220 (e.g., to receive the processed data records, process a command instruction via app device 220, or communicate with app device 220 in some other manner), and/or some other information that prepares app device 220 to process data.

Process 400 may further include providing provisioning information to the app device and updating network topology information (block 430). For example, aggregator server 225 may establish a tunnel with app device 220 and may provide the provisioning information for sensor device 215 and the provisioning information for app device 220 to app device 220 (e.g., via the tunnel) to prepare app device 220 to process data gathered by sensor device 215. In some implementations, aggregator server 225 may establish the tunnel and provide the provisioning information for sensor device 215 and for app device 220 when app device 220 connects to sensor network 240 (e.g., when app device 220 is to be added to sensor network 240). In some implementations, aggregator server 225 may encrypt the provisioning information and may provide the provisioning information via a secure channel to prevent an unauthorized device from receiving the provisioning information.

In some implementations, communications between app device 220 and aggregator server 225 (e.g., communications relating to provisioning app device 220) may occur via sensor network 240, thereby reducing network load on service provider network 250.

In some implementations, aggregator server 225 may store network topology information that identifies multiple app devices 220, applications that each app device 220 uses to process data, classes of data that each app device 220 is to process, addresses/tunnels of each app device 220 via which aggregator server 225 may communicate with each app device 220 to process a command instruction (e.g., local addresses associated with sensor network 240), and/or some other information that identifies app devices 220 associated with aggregator server 225.

In some implementations, aggregator server 225 may update the network topology information based on receiving the provisioning information for sensor device 215 and the provisioning information for app device 220. For example, the network topology information may be updated to reflect the addition of app device 220 and/or the addition of sensor device 215 in sensor network 240. Further, the network topology information may be updated to reflect connections between aggregator server 225, app device 220, and/or sensor device 215. Additionally, or alternatively, the network topology information may be updated to reflect a modification in the provisioning information of an existing app device 220 and/or an existing sensor device 215 (e.g., when the provisioning information includes the modification). As described in greater detail below, the network topology information may be used to communicate with particular app devices 220 associated with particular sensor devices 215 in order to process a command instruction.

Process 400 may also include receiving the provisioning information (block 440). For example, app device 220 may receive the provisioning information of sensor device 215 and of app device 220. In some implementations, app device 220 may install an application, identified by the provisioning information for app device 220, that is to be used to process data. In some implementations, app device 220 may store processing instructions, identified by the provisioning information for app device 220, that may be executed to form processed data records. In some implementations, app device 220 may perform some other task, based on the provisioning information, that identifies how app device 220 is to process data gathered by sensor device 215.

Process 400 may further include receiving sensor device profile information (block 450). For example, app device 220 may receive sensor device profile information when sensor device 215 connects to sensor network 240. In some implementations, the sensor device profile information (herein after referred to as "profile information") may include an identifier of sensor device 215, information identifying that sensor device 215 is to be provisioned (e.g., when sensor device 215 is not currently provisioned or is to be re-provisioned), information identifying a data class associated with data that is to be gathered by sensor device 215, information identifying a processing application that is to be used to process the data, a hardware profile of sensor device 215, and/or some other information associated with sensor device 215. In some implementations, sensor device 215 may broadcast profile information across sensor network 240 such that app devices 220 connected to sensor network 240 may receive the profile information.

Process 400 may also include provisioning the sensor device (block 460). For example, app device 220 may provision sensor device 215 when the profile information identifies that sensor device 215 is to provide data that app device 220 is capable of processing (e.g., based on a data class of data gathered by sensor device 215, a processing application that is to be used to process the data, etc.). For example, assume that the profile information identifies that sensor device 215 is to gather class 1 data. Further, assume that app device 220 is capable of processing class 1 data and that app device 220 stores provisioning information for sensor devices 215 that gather class 1 data. Given these assumptions, app device 220 may provision sensor device 215 by providing the provisioning information, associated with the class 1 data, to sensor device 215 such that sensor device 215 may gather data in accordance with the provisioning information. In some implementations, the provisioning information may direct sensor device 215 to establish a tunnel with app device 220 (e.g., in order for sensor device 215 to provide data to app device 220, for app device 220 to provide a control instruction to sensor device 215, and/or for sensor device 215 and app device 220 to communicate in some other manner).

In some implementations, multiple sensor devices 215 may be concurrently provisioned as the multiple sensor devices 215 connect to sensor network 240. For example, app device 220, provisioned to process data associated with different classes and using different applications, may provision the multiple sensor devices 215 as the multiple sensor devices 215 connect to sensor network 240. That is, app device 220 may discover the addition of sensor devices 215 and may provision sensor devices 215 based on the profile information of sensor devices 215 and the capabilities of app device 220. Further, communications between sensor devices 215 and app device 220 may occur via sensor network 240, independently of service provider network 250, thereby reducing network load on service provider network 250.

In some implementations (e.g., when multiple app devices 220 are capable of processing data associated with a particular sensor device 215), a particular app device 220 may be selected to provision the particular sensor device 215 based on a selection technique (e.g., a round-robin selection technique, a random selection technique, a selection technique based on load, or the like).

Process 400 may further include updating network topology information (block 470). For example, app device 220 may store network topology information that identifies one or more sensor devices 215 associated with app device 220 (e.g., sensor devices 215 that communicate with app device 220 via one or more tunnels). In some implementations, app device 220 may update the network topology information based on provisioning sensor device 215 and based on establishing a tunnel with sensor device 215 (e.g., to reflect the connection between sensor device 215 and app device 220).

While FIG. 4 shows process 400 as including a particular quantity and arrangement of blocks, in some implementations, process 400 may include fewer blocks, additional blocks, or a different arrangement of blocks. Additionally, or alternatively, some of the blocks may be performed in parallel. Also, in some implementations, one or more of the blocks may be omitted.

Figure 5A:
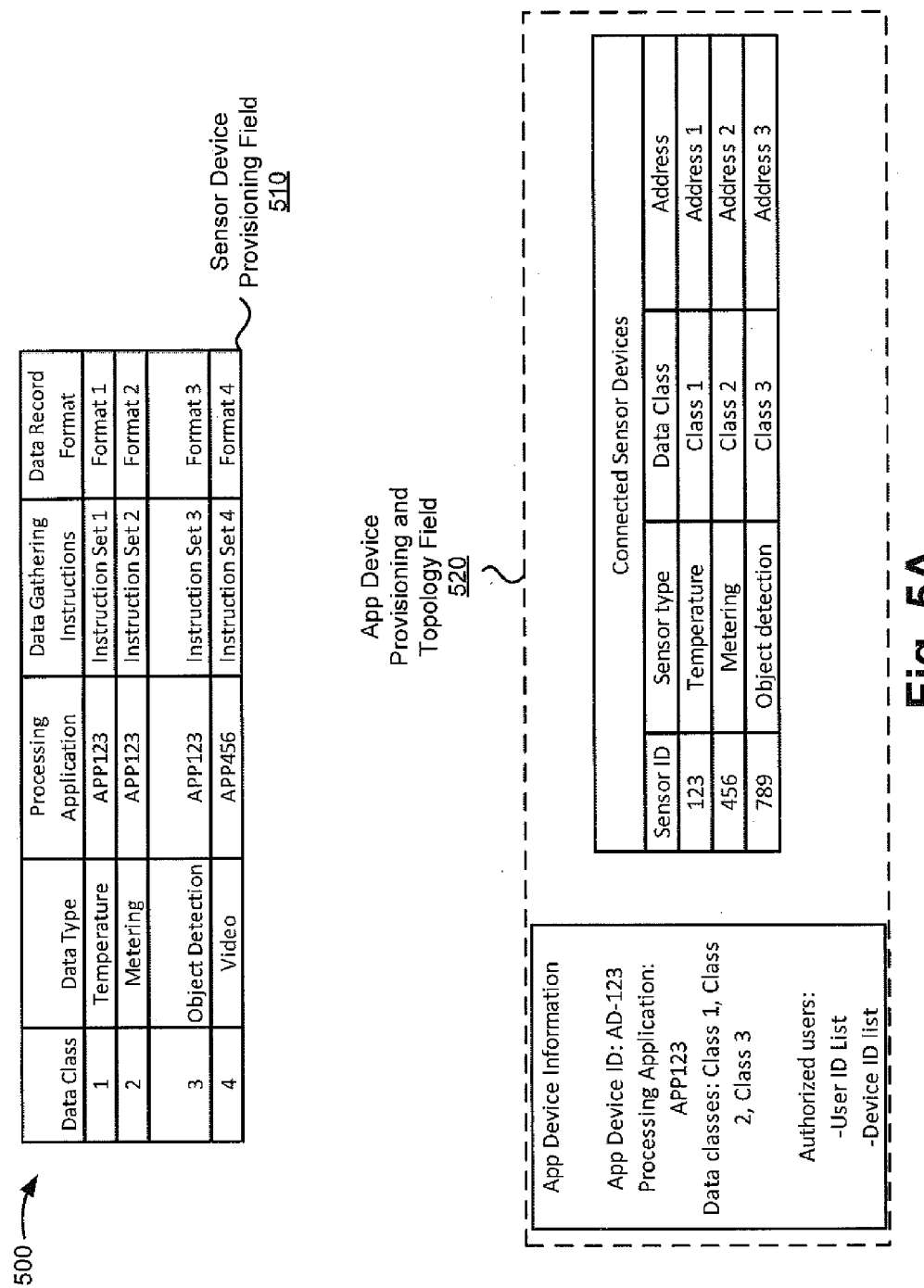

FIGS. 5A-5B illustrate an example data structure 500 that may be stored by one or more devices in environment 200, such as app device 220 and/or aggregator server 225. In some implementations, data structure 500 may be stored in a memory of app device 220 and/or aggregator server 225. In some implementations, data structure 500 may be stored in a memory separate from, but accessible by, app device 220 and/or aggregator server 225. In some implementations, data structure 500 may be stored by some other device in environment 200, such as user device 210, sensor device 215, and/or central app device 230.

A particular instance of data structure 500 may contain different information and/or fields than another instance of data structure 500. In some implementations, data structure 500 may store provisioning information for sensor device 215, provisioning information for app device 220, and/or network topology information associated with app device 220, aggregator server 225, and/or sensor network 240.

As shown in FIGS. 5A-5B, data structure 500 may include sensor device provisioning field 510, app device provisioning and topology field 520, and aggregator server topology field 530.

Sensor device provisioning field 510 (FIG. 5A) may store information to prepare sensor devices 215 to gather data. In some implementations, sensor device 215 may be provisioned based on a data class associated with data gathered by sensor device 215 and based on information stored by sensor device provisioning field 510. For example, as shown in FIG. 5A, a sensor device 215 that gathers class 1 data (e.g., data relating temperature measurements) may be provisioned to process the data via the application "APP123" (e.g., by providing the data to an app device 220 that processes the data via the application "APP123"). Additionally, or alternatively, sensor device 215 may be provisioned to gather data in accordance with a particular data gathering instruction set. In some implementations, the data gathering instruction set may identify times at which sensor device 215 may gather data, data that sensor device 215 may discard (e.g., data that correspond to signals detected from unauthorized devices), angles/orientations in which sensor device 215 is to gather data, and/or some other instruction relating to how sensor device 215 is to gather data. In some implementations, sensor device provisioning field 510 may store information that identifies a data record format that sensor device 215 is to use when forming data records based on gathering data.

In some implementations, app device 220 may receive sensor device provisioning information and may provide the provisioning information (e.g., based on a data class associated with sensor device 215) to provision sensor device 215 and to establish a tunnel with sensor device 215 (e.g., when sensor device 215 connects to sensor network 240 and when app device 220 is capable of processing data gathered by sensor device 215). Additionally, or alternatively, sensor device 215 may be pre-provisioned and may include information identifying the data gathering instructions, the data record format, and/or a particular app device 220 to which to provide data to process the data.

App device provisioning and topology field 520 may include provisioning information for a particular app device 220 and topology information that identifies sensor devices 215 connected to the particular app device 220. In some implementations, app device provisioning and topology field 520 may store an identifier (ID) of the particular app device 220, a list of authorized users that may communicate with the particular app device 220 (e.g., in connection with processing a command instruction), a list of capabilities associated with the particular app device 220 (e.g., an application that the particular app device 220 may use to process data, classes of data that the particular app device 220 may process, etc.), and/or some other information associated with the particular app device 220.

In some implementations, app device provisioning and topology field 520 may store information identifying sensor devices 215 connected to the particular app device 220 (e.g., when sensor devices 215 connect to sensor network 240 and when the particular app device 220 provisions sensor devices 215 in accordance with process blocks 450-460 as described above). In some implementations, app device provisioning and topology field 520 may store an ID of a connected sensor device 215, information identifying the type of data gathered by sensor device 215, a data class associated with sensor device 215, and/or information identifying an address and/or a tunnel via which app device 220 may communicate with sensor device 215 (e.g., to receive data from sensor device 215, provide a control instruction to sensor device 215, and/or communicate with sensor device 215 in some other manner in connection with processing a command instruction). In some implementations, app device provisioning and topology field 520 may store information identifying an address and/or a tunnel via which app device 220 may communicate with other app devices 220 in sensor network 240 (e.g., in order to process a command instruction).

Referring to 5B, aggregator server topology field 530 may store information identifying app devices 220 connected to aggregator server 225. For example, aggregator server 225 may store an ID of app device 220, information identifying an address and/or a tunnel via which aggregator server 225 may communicate with app device 220 (e.g., in order to process a command instruction), information identifying authorized users that may communicate with app device 220 (e.g., as part of processing the command instruction), information identifying applications that app device 220 may use to process data, and/or some other information relating to app devices 220 connected to aggregator server 225. In some implementations, aggregator server 225 may store information identifying an address and/or a tunnel via which aggregator server 225 may communicate with other aggregator servers 225 in sensor network 240.

In some implementations, information stored by data structure 500 may be used to facilitate communications between any quantity of sensor devices 215, app devices 220, and aggregator servers 225 within sensor network 240 (e.g., to process a command instruction, provision multiple app devices 220, and/or provision multiple sensor devices 215 independently of service provider network 250).

While particular fields are shown in a particular format in data structure 500, in practice, data structure 500 may include additional fields, fewer fields, different fields, or differently arranged fields than are shown in FIGS. 5A-5B. Also, FIGS. 5A-5B illustrate examples of information stored by data structure 500. In practice, other examples of information stored by data structure 500 are possible.

Figure 6:
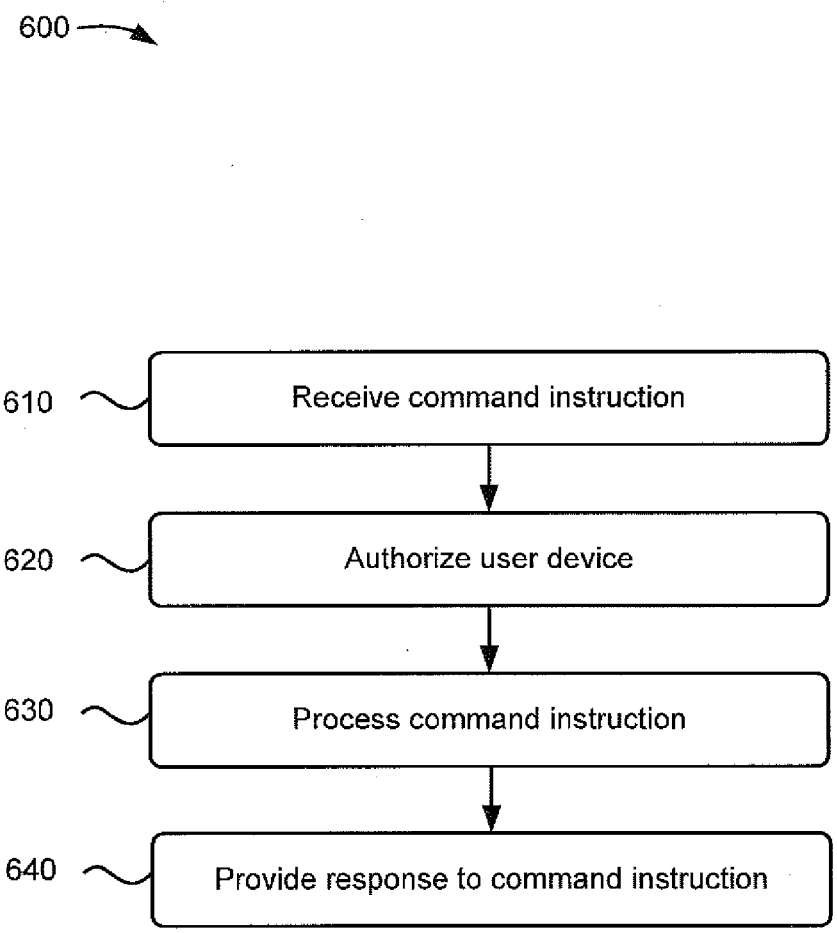
FIG. 6 illustrates a flowchart of an example process for processing a command instruction via a sensor network.

FIG. 6 illustrates a flowchart of an example process for processing a command instruction via a sensor network. In some implementations, process 600 may be performed by one or more components of aggregator server 225. In some implementations, some or all of blocks of process 600 may be performed by one or more components of another device in environment 200 (e.g., app device 220 and/or central app device 230), or a group of devices including or excluding aggregator server 225.

As shown in FIG. 6, process 600 may include receiving a command instruction (block 610). For example, aggregator server 225 may receive the command instruction from user device 210 via central app device 230 (e.g., via a web portal, an application, or some other technique). In some implementations, the command instruction may include information that aggregator server 225 may use to authorize user device 210 to communicate with app device 220 and/or sensor device 215 in order to process the command instruction (e.g., a user ID, a device ID, information identifying a location of user device 210, biometrics information, a security key, a password, and/or some other authorization/authentication related information). In some implementations, app device 220 may receive the command instruction via central app device 230 based on central app device 230 authorizing user device 210 to access service provider network 250 in order to communicate with aggregator server 225.

In some implementations, the command instruction may include information relating to a data record formed by sensor device 215. For example, the command instruction may include a data request for particular data records, associated with sensor device 215, that meet particular criteria. For example, the criteria may include a timeframe at which data was gathered by sensor device 215 (e.g., based on a timestamp of a data record), product information associated with the data record, a measurement value (or range of values) associated with the data record, information identifying a geographic location associated with the data record, and/or some other criteria associated with the data record. In some implementations, a data request may include a particular complexity measurement (e.g., based on the number of criteria used to identify data records). In some implementations, the criteria may indicate multiple particular sensor devices 215 from which to receive data records.

In some implementations, the data request may include a request for a report of data records meeting the criteria. Additionally, or alternatively, the data request may include a request for an alert when a data record, meeting the criteria, is gathered. For example, data request may be a one-time request for a single alert or a single report of data records. Additionally, or alternatively, the data request may include a recurring request for multiple alerts each time that a data record, meeting the criteria, is gathered. Additionally, or alternatively, the data request may include a recurring request for multiple reports of data records to be provided at recurring intervals (e.g., one report per day, per week, per month, etc.). Additionally, or alternatively, the data request may include a request for data records gathered by multiple sensor devices 215 and/or processed by multiple app devices 220.

In some implementations, the command instruction may include a control instruction to be provided to sensor device 215 via app device 220 (e.g., an instruction to adjust a sensor/metering device of sensor device 215, to adjust how data is gathered by sensor device 215, etc.). Additionally, or alternatively, the command instruction may include updates to provisioning information associated with sensor device 215, (e.g., updates to transmission policies, processing instructions, and/or devices authorized to communicate with sensor device 215). Additionally, or alternatively, the command instruction may include some other communication/request associated with sensor device 215 and related to data records formed by sensor device 215.

In some implementations, the command instruction may include a one-time control instruction to direct sensor device 215 and/or app device 220 to perform a task and/or a recurring control instruction to direct sensor device 215 and/or app device 220 to perform a task based on the occurrence of an event. Additionally, or alternatively, the command instruction may include a control instruction to direct aggregator server 225 to perform a task using multiple sensor devices 215 and/or multiple app devices 220. As an example, the command instruction may direct a first app device 220 to cause a first sensor device 215 to capture an image of an object when a second app device 220 forms a processed record that detects the presence of the object (e.g., based on data records from an object detection sensor associated with a second sensor device 215).

In some implementations, central app device 230 may select a particular aggregator server 225 to provide the command instruction based on sensor devices 215 and/or app devices 220 associated with the command instruction and connected to aggregator server 225. In some implementations (e.g., when the command instruction is associated with sensor devices 215 and/or app devices 220 connected to multiple aggregator servers 225), central app device 230 may select the particular aggregator server 225 based on measurements of load associated with the multiple aggregator servers 225 and may select the particular aggregator server 225 being the least loaded.

Process 600 may also include authorizing the user device (block 620). For example, aggregator server 225 may identify particular app devices 220, associated with the command instruction, and may authorize user device 210 based on authorization information stored by app device provisioning and topology field 520 and based on authorization information included in the command instruction. In some implementations, aggregator server 225 may authorize user device 210 when authorization information stored by app device provisioning and topology field 520 matches the authorization information included in the command instruction (e.g., when device ID information, user ID information, biometrics information, location information, and/or some other authorization related information included in the command instruction matches the authorization information in app device provisioning and topology field 520).

Process 600 may further include processing the command instruction (block 630). For example, aggregator server 225 may process the command instruction based on receiving the command instruction and authorizing user device 210. In some implementations, aggregator server 225 may identify one or more particular app devices 220 and/or sensor devices 215 that may be involved in processing the command instruction.

As an example, assume that the command instruction includes a request for data records meeting particular criteria. Given this assumption, aggregator server 225 may identify data records, formed by one or more sensor devices 215 and/or processed by one or more app devices 220, meeting the particular criteria in the command instruction. For example, aggregator server 225 may receive data records from sensor devices 215 and/or app devices 220

(e.g., via tunnels between sensor devices 215, app devices 220, and aggregator servers 225 connected to sensor network 240), store the data records, and identify the data records that meet the criteria. In some implementations, aggregator server 225 may request the data records based on receiving the command instruction.

Additionally, or alternatively, aggregator server 225 may receive and store data records from sensor devices and/or app devices 220 without receiving the command instruction and may look up data records meeting the criteria when receiving the command instruction. In some implementations, identified data records may include a report of data records meeting the criteria and/or an alert when sensor device 215 gathers a data record that meets the criteria and/or when app device 220 processes a data record that meets the criteria. In some implementations, the identified data records may aid in analysis, such as a sales trend analysis (e.g., to identify targeted content for a user), a temperature trend analysis, a failure analysis, and/or some other type of analysis).

As another example, assume that the command instruction includes a control instruction for sensor device 215. Given this assumption, aggregator server 225 may provide the control instruction to sensor device 215 via app device 220. For example, aggregator server 225 may provide the control instruction to app device 220 via one or more tunnels connecting aggregator server 225 and app device 220 (e.g., based on information stored by data structure 500). In some implementations, app device 220 may provide the control instruction to sensor device 215 via one or more tunnels connecting app device 220 to sensor device 215.

As another example, assume that the command instruction includes an update to provisioning information for sensor device 215 and/or app device 220. Given this assumption, aggregator server 225 may provide the update to the provisioning information to app device 220. For example, aggregator server 225 may provide the update to the provisioning information to app device 220 via one or more tunnels connecting aggregator server 225 and app device 220 (e.g., based on information stored by data structure 500). In some implementations, app device 220 may provide the update to the provisioning information to sensor device 215 via one or more tunnels connecting app device 220 to sensor device 215.

In some implementations, aggregator server 225 may form a response to the command instruction based on processing the command instruction. For example, the response may include data records meeting particular criteria (e.g., when the command instruction includes a request for data meeting the particular criteria). In some implementations, the response may correspond to a one-time request for data records meeting particular criteria, a recurring request for data records meeting particular criteria, and/or data records associated with an alarm. In some implementations (e.g., when the command instruction includes a control instruction), the response may include an indication that sensor device 215 and/or app device 220 has received and/or executed the control instruction. In some implementations, the response may include some other information corresponding to a response to the command instruction.

In some implementations, communications between sensor device 215, app device 220, and/or aggregator server 225 (e.g., communications relating to processing the command instruction) may occur within sensor network 240, thereby reducing load on service provider network 250.

Process 600 may also include providing the response (block 640). For example, aggregator server 225 may provide the data to user device 210 (e.g., via central app device 230) based on processing the command instruction and forming the response. In some implementations, aggregator server 225 may encrypt the data and may provide the data via a secure channel to prevent an unauthorized device from receiving the response.

While FIG. 6 shows process 600 as including a particular quantity and arrangement of blocks, in some implementations, process 600 may include fewer blocks, additional blocks, or a different arrangement of blocks. Additionally, or alternatively, some of the blocks may be performed in parallel. Also, in some implementations, one or more of the blocks may be omitted.

Figure 7:
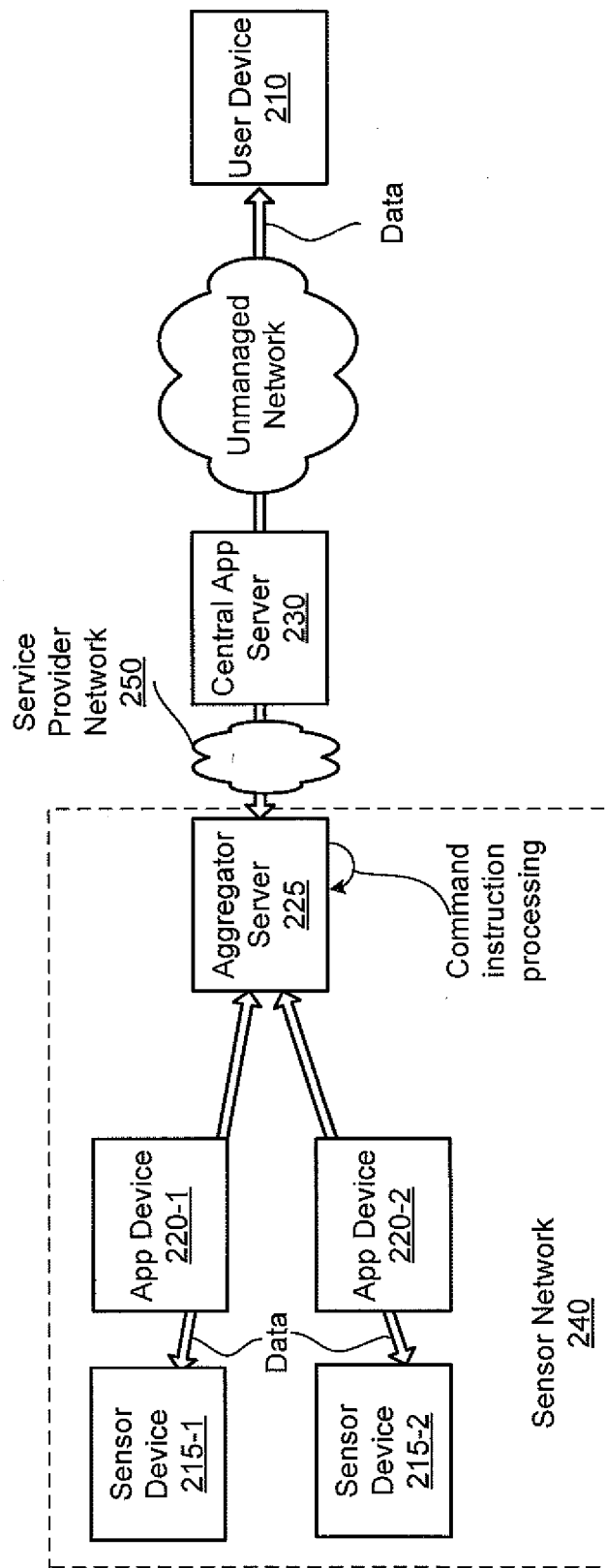

FIG. 7 illustrates an example implementation as described herein. As shown in FIG. 7, central app device 230 may facilitate the communication of data, relating to a command instruction, between user device 210, app device 220-1, app device 220-2, sensor device 215-1, and sensor device 215-2. For example, central app device 230 may receive a command instruction from user device 210 via an unmanaged network (e.g., network 260), authorize user device 210 to access service provider network 250 to send/receive data relating to the command instruction, and transmit data, relating to the command instruction, to/from user device 210, app device 220-1, app device 220-2, sensor device 215-1, and sensor device 215-2 (e.g., in accordance with process 600 as described above).

In some implementations, aggregator server 225 may receive and/or store data records formed by sensor device 215-1 and sensor device 215-2. Further, aggregator server 225 may receive and/or store processed data records formed by app device 220-1 and app device 220-2. Also, aggregator server 225 may connect with sensor device 215-1, sensor device 215-2, app device 220-1, and/or app device 220-2 via sensor network 240 to process the command instruction. As a result, the command instruction may be processed within sensor network 240, thereby reducing load on service provider network 250. Further, sensor device 215-1, sensor device 215-2, app device 220-1, app device 220-2, and/or central app device 225 may not be directly accessible by user device 210, thereby increasing security while still permitting user device 210 to transmit/receive data relating to a command instruction.

While a particular example is shown in FIG. 7, the above description is merely an example implementation. In practice, other examples are possible from what is described above in FIG. 7.

Figure 8:
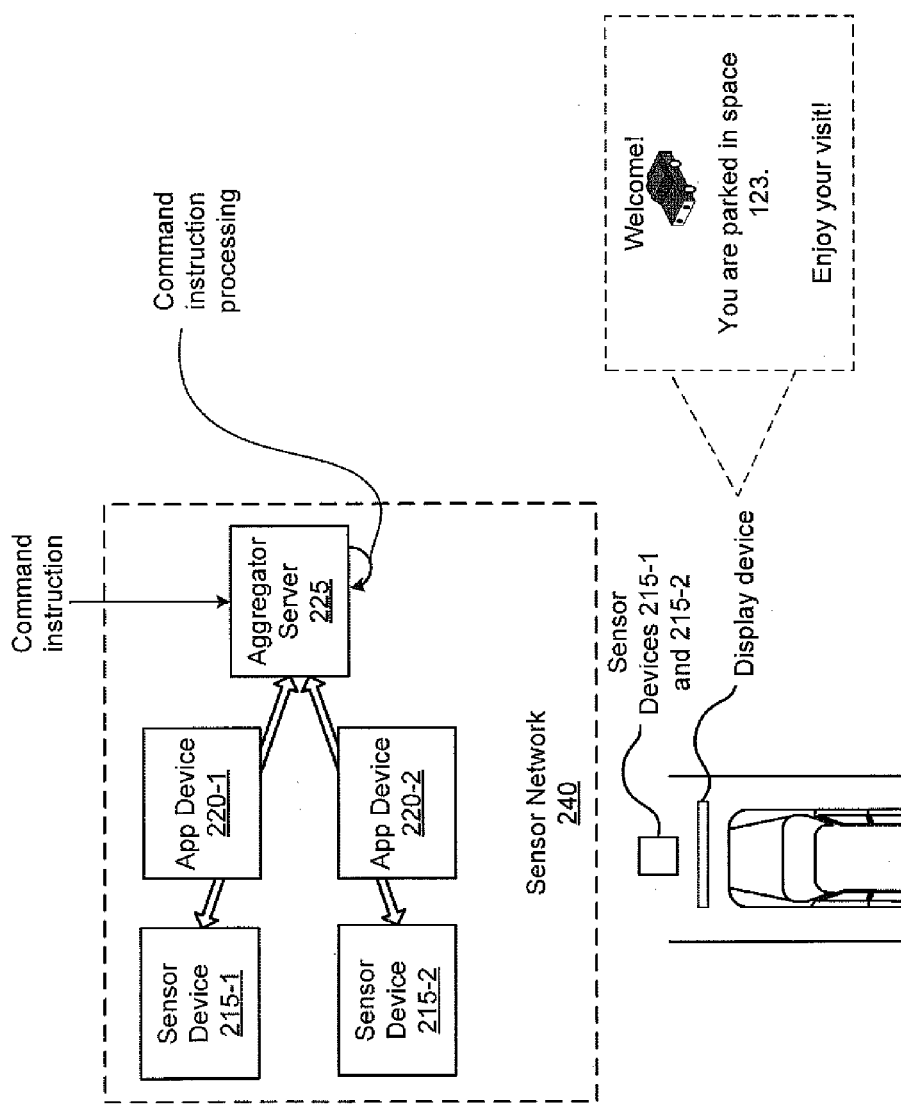

FIG. 8 illustrates an example implementation as described herein. As shown in FIG. 8, aggregator server 225 may receive a command instruction (e.g., from user device 210 via central app device 230, in accordance with block 610 as described above). In FIG. 8, assume that the command instruction includes a control instruction to direct sensor device 215-2 to capture an image when app device 220-1 detects a vehicle based on data received from sensor device 215-1. Further, assume that the command instruction directs aggregator server 225 to provide content to a display device. For example, the content may include the captured image and/or targeted content based on a license plate tag of the vehicle, the make/model of the vehicle, and/or some other information regarding the vehicle.

Further, assume that sensor device 215-2 is oriented to detect when a vehicle parks in a parking space and that sensor device 215-1 is oriented to capture an image of the vehicle. Given these assumptions, aggregator server 225 may process the command instruction by directing app device 220-2 to provide aggregator server 225 with an indication that a vehicle has been detected and directing app device 220-1 to capture an image (e.g., using sensor device 215-1) when aggregator server 225 receives the indication.

In some implementations, app device 220-2 may detect the vehicle based on data received from sensor device 215-2. For example, sensor device 215-2 may include a video camera, a metal detection sensor, a carbon monoxide sensor, an RFID sensor that identifies the presence of an object when the object emits an RFID signal, a scale, and/or some other type of sensor that gathers data relating to object detection.

As an example, app device 220-2 may detect the vehicle when receiving video from sensor device 215-2 and determining that the vehicle enters the field of view of sensor device 215-2 (e.g., based on pixel-based identification technology that identifies objects, such as the shape of the vehicle, or the license plate of the vehicle, based on pixel patterns in a video or image). As another example, app device 220-2 may detect the vehicle when receiving a measurement of weight from sensor device 215-2 that indicates that the vehicle has parked in the parking space. In some implementations, app device 220-2 may provide the indication that the vehicle has been detected to aggregator server 225 and aggregator server 225 may direct app device 220-1 to capture an image of the vehicle using sensor device 215-1.

In some implementations, aggregator server 225 may receive the captured image and may provide the captured image to a display device, as shown in interface 800. In some implementations, aggregator server 225 may provide some other content to the display device (e.g., targeted content based on the license plate of the vehicle as identified by the captured image). In some implementations, the display device may be located in a different location than what is shown and my display content relating to parking availability in a parking facility and/or parking rates that may be based on parking availability.

As shown in FIG. 8, the communications between sensor device 215-1, sensor device 215-2, app device 220-1, and app device 220-2 to process the command instruction may occur within sensor network 240 while the command instruction may be received via service provider network 250. Also, the command instruction may be processed with lower latency within sensor network 240 than if the command instruction were to be processed via service provider network 250, thereby improving the performance of a time-sensitive application (e.g., when an image is to be captured of an object that may be moving).

While a particular example is shown in FIG. 8, the above description is merely an example implementation. In practice, other examples are possible from what is described above in FIG. 8. For example, aggregator server 225 may perform some other task based on receiving the captured image or based on receiving the indication of the detected vehicle. In some implementations, the command instruction may include some other instruction than what is described. For example, the command instruction may direct aggregator server 225 to provide an alert when app device 220 detects a vehicle intrusion (e.g., based on audio corresponding to an intrusion received by sensor device 215, based on pixel-based analysis of an image that identifies an intrusion event, such as broken glass, etc.).

FIG. 9 illustrates an example implementation as described herein. As shown in FIG. 9, aggregator server 225 may receive a command instruction (e.g., from user device 210 via central app device 230, in accordance with block 610 as described above). In FIG. 9, assume that the command instruction includes a request to receive an alert when data records, meeting particular criteria, are gathered and/or processed. For example, assume that the command instruction includes a request to receive an alert when data records that measure a level of a resource (e.g., a battery level, a fluid level, or the like) indicate that the resource level has dropped below a particular threshold and when data records that measure the temperature of the resource indicate that the temperature has exceeded the particular threshold. Further, assume that app device 220-1 forms processed data records (e.g., based on data received from sensor device 215-1) that indicates the measure of the resource level. Further, assume that app device 220-2 forms processed data records (e.g., based on data received from sensor device 215-2) that indicates the measure of temperature for the resource.

Given these assumptions, aggregator server 225 may process the command instruction by providing a data request to app device 220-1 to provide an alert to aggregator server 225 when app device 220-1 identifies that the resource level has dropped below the particular threshold. Further, aggregator server 225 may provide a data request to app device 220-2 to provide an alert to aggregator server 225 when app device 220-2 identifies that the temperature of the resource has exceeded the particular threshold. Further, aggregator server 225 may provide an alert to user device 210 when aggregator server 225 receives the alerts from app device 220-1 and app device 220-2. As shown in FIG. 9, the communications between sensor device 215-1, sensor device 215-2, app device 220-1, and app device 220-2 to process the command instruction may occur within sensor network 240.

While a particular example is shown in FIG. 9, the above description is merely an example implementation. In practice, other examples are possible from what is described above in FIG. 9. For example, the command instruction may direct app device 220 and/or sensor device 215 to trigger a switch/actuator (e.g., to trigger an alarm, activate/deactivate a device, etc.), capture an image of a vehicle license plate, adjust a sensor and/or metering device, or perform some other task based on the occurrence of an event as identified by sensor device 215 and/or app device 220 (e.g., the detection of an object, the detection of a measurement associated with data record exceeding or dropping below a threshold, the detection of a facility intrusion, the detection of fire/smoke/carbon monoxide, and/or the detection of some other event by sensor device 215 and/or app device 220).

As described above, app devices 220 may receive provisioning information for sensor devices 215 such that when sensor devices 215 connect to sensor network 240, sensor devices 215 may be concurrently provisioned (e.g., receive and execute instructions that identify how data is to be gathered by sensor devices 215). Further, aggregator servers 225 may receive provisioning information for multiple app devices 220 such that when app devices 220 connect to sensor network 240, app devices 220 may be concurrently provisioned.

In some implementations, the provisioning information for sensor devices 215 and/or app devices 220 may be customized for particular classes of data flows associated with sensor device 215 and/or app devices 220 and may include fewer and/or less complex provisioning instructions than if sensor devices 215 and/or app devices 220 were to communicate via service provider network 250.

In some implementations, communications between sensor devices 215, app devices 220, and/or aggregator servers 225 (e.g., communications relating to processing a command instruction) may occur within sensor network 240, thereby reducing load on service provider network 250 while allowing user device 215 to provide the command instruction and receive a response to the command instruction via the service provider network. Also, processing the command instruction within sensor network 240 may prevent the need for sensor devices 215 and/or app devices 220 to communicate via service provider network 250, thereby reducing labor and/or other costs associated with establishing/maintaining connections between sensor devices 215, app devices 220, and service provider network 250. For example, the connections to service provider network 250 may be associated with bearers having higher QoS requirements than needed to process communications between sensor devices 215, app devices 220, and/or aggregator servers 225. Additionally, or alternatively, the connections to service provider network 250 may include multiple channels and/or services that may not be needed by sensor devices 215 and/or app devices 220 (e.g., voice call channels/services, video delivery channels/services, etc.).

While implementations described herein describe processing a command instruction within sensor network 240, in practice, some communications for processing the command instruction may occur outside sensor network 240 (e.g., as a redundancy when sensor network 240 is unavailable, and/or when a particular sensor device 215, app device 220, and/or aggregator server 225 is unavailable to communicate via sensor network 240).

The foregoing description provides illustration and description, but is not intended to be exhaustive or to limit the possible implementations to the precise form disclosed. Modifications and variations are possible in light of the above disclosure or may be acquired from practice of the implementations.

It will be apparent that different examples of the description provided above may be implemented in many different forms of software, firmware, and hardware in the implementations illustrated in the figures. The actual software code or specialized control hardware used to implement these examples is not limiting of the implementations. Thus, the operation and behavior of these examples were described without reference to the specific software code—it being understood that software and control hardware can be designed to implement these examples based on the description herein.

Some implementations are described herein in conjunction with thresholds. The term "greater than" (or similar terms), as used herein to describe a relationship of a value to a threshold, may be used interchangeably with the term "greater than or equal to" (or similar terms). Similarly, the term "less than" (or similar terms), as used herein to describe a relationship of a value to a threshold, may be used interchangeably with the term "less than or equal to" (or similar terms). As used herein, "satisfying" a threshold (or similar terms) may be used interchangeably with "being greater than a threshold," "being greater than or equal to a threshold," "being less than a threshold," "being less than or equal to a threshold," or other similar terms, depending on the context in which the threshold is used.

Even though particular combinations of features are recited in the claims and/or disclosed in the specification, these combinations are not intended to limit the disclosure of the possible implementations. In fact, many of these features may be combined in ways not specifically recited in the claims and/or disclosed in the specification. Although each dependent claim listed below may directly depend on only one other claim, the disclosure of the possible implementations includes each dependent claim in combination with every other claim in the claim set.

No element, act, or instruction used in the present application should be construed as critical or essential unless explicitly described as such. Also, as used herein, the article "a" is intended to include one or more items and may be used interchangeably with "one or more." Where only one item is intended, the term "one" or similar language is used. Further, the phrase "based on" is intended to mean "based, at least in part, on" unless explicitly stated otherwise.

What is claimed is:

1. A method comprising:
   receiving, by an aggregator device, provisioning information for an application device;
   establishing, by the aggregator device, a tunnel with the application device within a sensor network based on receiving the provisioning information;
   providing, by the aggregator device, the provisioning information to the application device to cause the application device to gather or process data within the sensor network;
   receiving, by the aggregator device, a command instruction from a user device via a service provider network, the command instruction relating to the data gathered or processed by the application device, and
   the sensor network being separate from the service provider network;
   communicating, by the aggregator device, with the application device, within the sensor network and independently of the service provider network, to process the command instruction,
   the command instruction being processed within the sensor network to reduce load on the service provider network;
   forming, by the aggregator device, a response to the command instruction based on processing the command instruction; and
   providing, by the aggregator device, the response to the command instruction towards the user device.

2. The method of claim 1, where the command instruction includes an instruction to cause the application device to adjust a sensor device, capture an image via a camera device, trigger a switch, provide content, or provide an alert based on an occurrence of an event that is identified by the application device based on the data gathered or processed by the application device.

3. The method of claim 1, where the application device is a machine-to-machine device.

4. The method of claim 1, further comprising:
   authorizing the user device based on authorization information included in the command instruction; and
   where communicating with the application device to process the command instruction is based on authorizing the user device.

5. The method of claim 1, further comprising:
   receiving the command instruction via first device based on the first device authorizing the user device to access the service provider network to provide the command instruction; and
   where receiving the command instruction from the user device includes receiving the command instruction via the first device.

6. The method of claim 1, where the provisioning information includes provisioning information for a first device to gather data, and
   where providing the provisioning information to the application device causes the application device to establish a tunnel with the first device and process data gathered by the first device.

7. The method of claim 6, where providing the provisioning information to the application device further causes the application device to determine that the application device is capable of processing data gathered by the first device and establish the tunnel based on determining that the application device is capable of processing data gathered by the first device.

8. A system comprising:
an aggregator device to:
receive provisioning information for an application device,
the application device being associated with a machine-to-machine device;
establish a tunnel with the application device within a sensor network based on receiving the provisioning information;
provide the provisioning information to the application device to cause the application device to gather or process data within the sensor network;
receive a command instruction from a user device via a service provider network,
the command instruction relating to the data gathered or processed by the application device, and
the sensor network being separate from the service provider network;
communicate with the application device within the sensor network and independently of the service provider network to process the command instruction,
the command instruction being processed via the sensor network to reduce load on the service provider network;
form a response to the command instruction based on processing the command instruction; and
provide the response to the command instruction towards the user device.

9. The system of claim 8, where the command instruction includes an instruction to cause the application device to adjust a sensor device, capture an image via a camera device, trigger a switch, provide an alert, or provide content based on the an occurrence of an event that is identified by the application device based on the data gathered or processed by the application device.

10. The system of claim 8, where the aggregator device is further to:
authorize the user device based on authorization information included in the command instruction, and
where, when communicating with the application device to process the command instruction, the aggregator device is to:
communicate with the application device to process the command instruction based on authorizing the user device.

11. The system of claim 8, where the aggregator device is further to:
receive the command instruction via a first device based on the first device authorizing the user device to access the service provider network to provide the command instruction, and
where, when receiving the command instruction from the user device, the aggregator device is to:
receive the command instruction from the user device via the first device.

12. The system of claim 8, where the provisioning information includes provisioning information for a first device to gather data, and
where, when providing the provisioning information to the application device, the aggregator device is to:
provide the provisioning information to cause the application device to establish a tunnel with the first device and process data gathered by the first device.

13. A non-transitory computer-readable medium for storing instructions, the instructions comprising:
a plurality of instructions which, when executed by one or more processors associated with an aggregator device, cause the one or more processors to:
receive provisioning information for an application device;
establish a tunnel with the application device within a sensor network based on receiving the provisioning information;
provide the provisioning information to the application device to cause the application device to gather or process data within the sensor network;
receive a command instruction from a user device via a service provider network,
the command instruction relating to the data gathered or processed by the application device, and
the sensor network being separate from the service provider network;
authorize the user device based on authorization information included in the command instruction;
communicate with the application device within the sensor network and independently of the service provider second network to process the command instruction based on authorizing the user device,
the command instruction being processed within the sensor network to
reduce load on the service provider network;
form a response to the command instruction based on processing the command instruction; and
provide the response to the command instruction towards the user device.

14. The non-transitory computer-readable medium of claim 13, where the command instruction includes an instruction to cause the application device to adjust a sensor device, capture an image via a camera device, trigger a switch, provide an alert, or provide content based on an occurrence of an event that is identified by the application device based on the data gathered or processed by the application device.

15. The non-transitory computer-readable medium of claim 13, where the application device is associated with a machine-to-machine device.

16. The non-transitory computer-readable medium of claim 13, where the plurality of instructions further cause the one or more processors to:
receive the command instruction via a first device based on the first device authorizing the user device to access service provider network to provide the command instruction, and
where the plurality of instructions, when receiving the command instruction from the user device, cause the one or more processors to:
receive the command instruction from the user device via the first device.

17. The non-transitory computer-readable medium of claim 13, where the provisioning information includes provisioning information for a first device to gather data, and where the plurality of instructions, when providing the provisioning information to the application device, cause the one or more processors to:
provide the provisioning information to cause the application device to establish a tunnel with the first device and process data gathered by the first device.

18. The method of claim 1, where forming the response comprises:
encrypting the response.

19. The system of claim 8, where the aggregator device is further to:
encrypt the provisioning information; and
where, when providing the provisioning information to the application device, the aggregator device is to:
provide the encrypted provisioning information.

20. The non-transitory computer-readable medium of claim 13, where the plurality of instructions, when executed by the one or more processors, further cause the one or more processors to:
update network topology information based on receiving the provisioning information.

* * * * *